US 7,958,452 B2

(12) United States Patent  (10) Patent No.: US 7,958,452 B2
Sodhi et al.  (45) Date of Patent: Jun. 7, 2011

(54) SYSTEM AND METHOD FOR THIN CLIENT DEVELOPMENT OF A PLATFORM INDEPENDENT GRAPHICAL USER INTERFACE

(75) Inventors: Ajit Sodhi, Irvine, CA (US); Alok Mathur, Lake Forest, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1169 days.

(21) Appl. No.: 11/626,811

(22) Filed: Jan. 24, 2007

(65) Prior Publication Data

US 2008/0178108 A1  Jul. 24, 2008

(51) Int. Cl.
  *G06F 3/048* (2006.01)
(52) U.S. Cl. ....................................................... 715/744
(58) Field of Classification Search .................. 715/738, 715/740, 763, 744, 745, 746, 747
See application file for complete search history.

(56) References Cited

U.S. PATENT DOCUMENTS

7,443,523 B2 * 10/2008 Leone et al. ................. 358/1.15
2004/0225504 A1 * 11/2004 Junqua et al. ................. 704/275
* cited by examiner

*Primary Examiner* — Thanh T Vu
(74) *Attorney, Agent, or Firm* — SoCal IP Law Group LLP; Stevn C. Sereboff; Jonathan Pearce (57) ABSTRACT

The subject application is directed to a system and method for thin client graphical user interface development. Primitive data is stored in associated memory corresponding to graphical user interface primitives. Each primitive corresponds to a display or a control of an associated document processing device. Selection data is received via a thin client, representing primitive data corresponding to at least one graphical user interface primitive. The primitive data is selectively communicated to a display associated with the thin client according to the received selection data resulting in the generation of visual indicia on the display. A data set is generated representing a graphical user interface display according to a selected set of indicia that is displayed on the thin client. Map data is generated representing the mapping of a generated data set to user interface data, corresponding to the display and the control of one or more document processing devices.

18 Claims, 5 Drawing Sheets

SYSTEM AND METHOD FOR THIN CLIENT DEVELOPMENT OF A PLATFORM INDEPENDENT GRAPHICAL USER INTERFACE

BACKGROUND OF THE INVENTION

The subject application is directed to a system and method for thin client graphical user interface development. In particular, the subject application is directed to a system and method for developing and integrating a graphical user interface for document processing operations.

Modern devices perform a myriad of complex tasks. A graphical user interface is a preferred mechanism to allow for relative ease in control or operation of such devices in an intuitive manner. By judicious selection and placement of control indicia, such as icons, text, pictures, and the like, an unsophisticated or casual user can readily control complex operations. Graphical user interfaces are particularly useful in connection with document processing devices, such as printers, copiers and facsimile machines, particularly office devices that have more than one of these traditional document processing capabilities. Intuitive interfaces are largely essential when one or more of these traditional functions is coupled, together with more modern additions of electronic mail or electronic document transmission or storage, including local and wide area electronic document communication.

Development of an effective graphical user interface is a difficult and time consuming process. A developer must understand precise details of operation of an associated device, including a series of operations that may be required for a particular task. For example, a copying operation may require two-sided or duplex copying, collating multiple copies and completion of a stapling or a hole punch operation on each completed copy. A well-designed graphical user interface requires a developer to be able to view, critique, and refine an interface during development.

Earlier systems require a developer to write complex machine instructions to generate and place various components of a user interface during development. This process makes it difficult to accurately visualize an interface under development. Furthermore, such a procedure is prone to lack the optimization and refinement that would result from a graphical development tool that allows for quick assembly of a user interface with immediate visual feedback as to an interface under development.

In addition to the forgoing, current user interface development is relegated to a particular target device. By way of example, an interface developed for operation on a Windows device platform would have to be rewritten to operate on a Linux platform. Further, an interface written for a 640×480 pixel CRT with mouse control may need to be rewritten to operation on a 1024×768 LCD touchscreen. Thus, redundant, time consuming development must be made for different device platforms.

It would be desirable to have a system and method to facilitate fast and accurate development of graphical user interfaces, which interfaces are readily integrated to different device platforms, including different hardware or software environments.

SUMMARY OF THE INVENTION

In accordance with the subject application, there is provided a system and method for thin client graphical user interface development.

Further, in accordance with subject application, there is provided a system and method for developing and integrating a graphical user interface for document processing operations.

Still further, in accordance with the subject application, there is provided a system and method to facilitate fast and accurate development of graphical user interfaces, which interfaces are readily integrated to different device platforms, including different hardware or software environments.

Still further, in accordance with the subject application, there is provided a system for thin client graphical user interface development. The system includes a memory adapted for storing primitive data corresponding to a plurality of graphical user interface primitives, wherein each primitive corresponds to at least one of a display and control of an associated document processing device. The system also includes means adapted for receiving selection data via an associated thin client, which selection data corresponds to primitive data corresponding to at least one of the graphical user interface primitives. The system further includes means adapted for selectively communicating primitive data to an associated thin client display in accordance with received selection data so as to generate a corresponding visual indicia thereon and means adapted for generating a data set representative of a graphical user interface display in accordance with a selected set of indicia displayed on the associated thin client display. The system also comprises mapping means adapted for generating map data representative of a mapping of a generated data set to user interface data corresponding to a display for and control of at least one associated document processing device.

In one embodiment, the system further includes means adapted for communicating map data to a local memory disposed on the at least one associated document processing device. In such embodiment, the at least one associated document processing device includes a user interface including input means and a local graphical display means, means adapted for generating a display on the local graphical display means corresponding to the map data disposed in the local memory, and means adapted for receiving user selection data via the input means, which user selection data corresponds to operation of the document processing device. In addition, the at least one associated document processing device includes means adapted for communicating received user selection data to the local memory so as to generate control data in accordance with the map data and means adapted for controlling operation of the document processing device in accordance with the control data.

In a preferred embodiment, the user selection data is received via the input means including a touch screen corresponding to the local graphical display. In another preferred embodiment, the user selection data is received via the input means including a pointer corresponding to a selected position on the local graphical display.

In another embodiment, the system further includes means adapted for receiving interface data including at least one of bit depth and resolution of a display. In this embodiment, the mapping means includes means adapted for generating the map data in accordance with received interface data.

In yet another embodiment, the selection data includes position data corresponding to a position of primitives on the associated thin client and on a local graphical display on the at least one associated document processing device.

Still further, in accordance with the subject application, there is provided a method for thin client graphical user interface development in accordance with the system as set forth above.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and description will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed to a system and method for thin client graphical user interface development. In particular, the subject application is directed to a system and method for developing and integrating a graphical user interface for document processing operations. More particularly, the subject application is directed to a system and method to facilitate fast and accurate development of graphical user interfaces, which interfaces are readily integrated to different device platforms, including different hardware or software environments. It will become apparent to those skilled in the art that the system and method described herein are suitably adapted to a plurality of varying electronic fields employing user interfaces, including, for example and without limitation, communications, general computing, data processing, document processing, or the like. The preferred embodiment, as depicted in FIG. 1, illustrates a document processing field for example purposes only and is not a limitation of the subject application solely to such a field.

Figure 1:
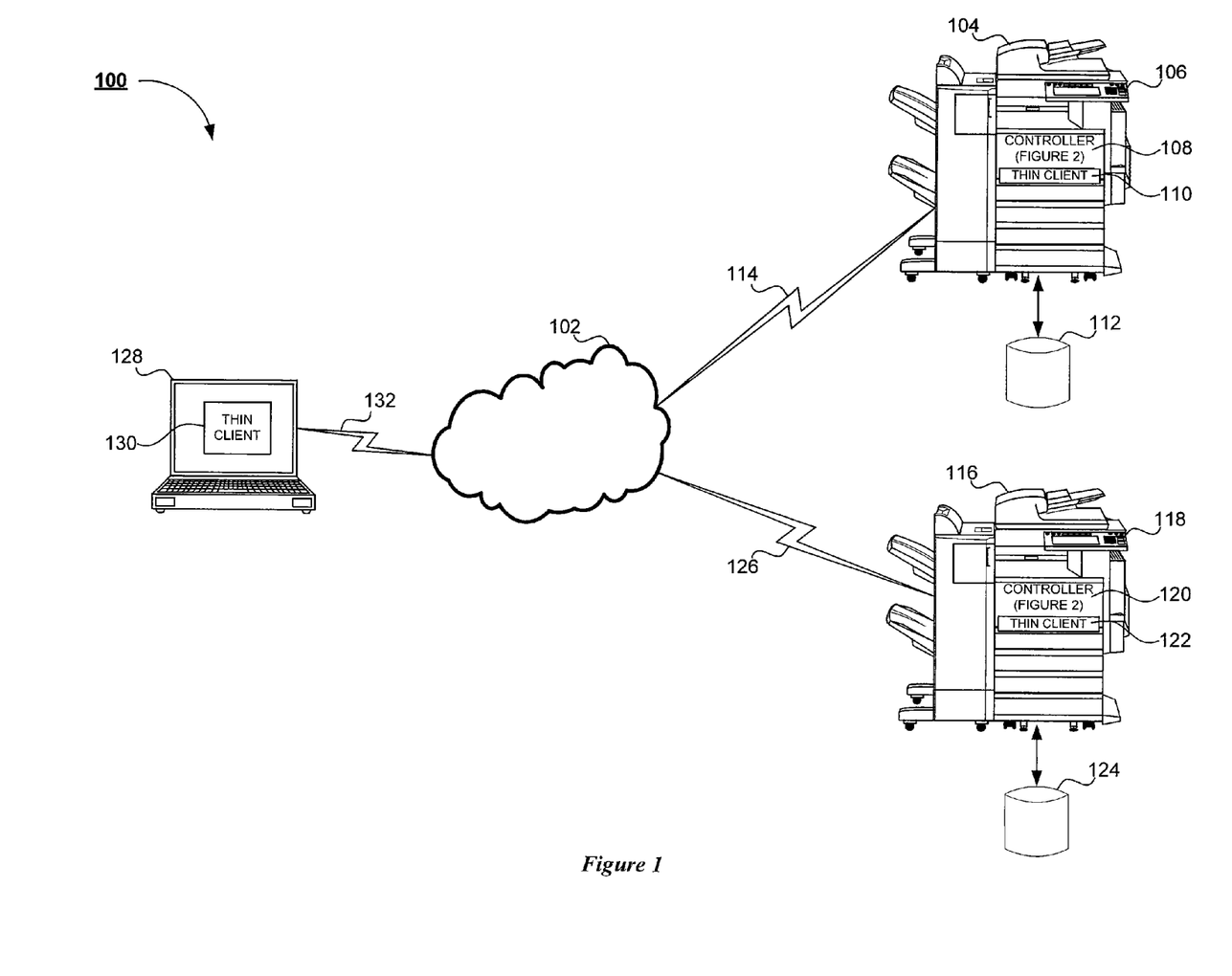
FIG. 1 is an overall diagram of the thin client graphical user interface development system according to the subject application.

Referring now to FIG. 1, there is shown a block diagram illustrating a thin client graphical user interface development system 100 in accordance with the subject application. As shown in FIG. 1, the system 100 is capable of implementation using a distributed computing environment, illustrated as a computer network 102. It will be appreciated by those skilled in the art that the computer network 102 is any distributed communications system known in the art capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or the any suitable combination thereof. In accordance with the preferred embodiment of the subject application, the computer network 102 is comprised of physical layers and transport layers, as illustrated by the myriad of conventional data transport mechanisms, such as, for example and without limitation, Token-Ring, 802.11(x), Ethernet, or other wireless or wire-based data communication mechanisms. The skilled artisan will appreciate that while a computer network 102 is shown in FIG. 1, the subject application is equally capable of use in a stand-alone system, as will be known in the art.

The system 100 also includes one or more document processing devices, shown in FIG. 1 as the document processing device 104 and the document processing device 116. The document processing devices 104, 116 are depicted in FIG. 1 as multifunction peripheral devices, suitably adapted to perform a variety of document processing operations. It will be appreciated by those skilled in the art that such document processing operations include, for example and without limitation, facsimile, scanning, copying, printing, electronic mail, document management, file storage, file transfer, or the like. Suitable commercially available document processing devices include, for example and without limitation, the Toshiba e-Studio Series Controller. In accordance with one aspect of the subject application, the document processing devices 104 and 116 are suitably adapted to provide remote document processing services to external or network devices. In addition thereto, the subject application further enables the accessing of external resources via the document processing devices 104 and 116. Preferably, the document processing devices 104 and 116 include hardware, software, and any suitable combination thereof, configured to interact with an associated user, a networked device, or the like. According to one embodiment of the subject application, the document processing devices 104 and 116 are suitably equipped to receive a plurality of portable storage media, including, without limitation, Firewire drive, USB drive, SD, MMC, XD, Compact Flash, Memory Stick, and the like.

In the preferred embodiment of the subject application, the document processing device 104 further includes an associated user interface 106, such as a touch-screen, LCD display, touch-panel, pointer device, alpha-numeric keypad, or the like, via which an associated user is able to interact directly with the document processing device 104. In accordance with the preferred embodiment of the subject application, the user interface 106 is advantageously used to communicate information to the associated user and receive selections from the associated user. The skilled artisan will appreciate that the user interface 106 comprises various components, suitably adapted to present data to the associated user, as are known in the art. In accordance with one embodiment of the subject application, the user interface 106 comprises a display, suitably adapted to display one or more graphical elements, text data, or the like, to an associated user, receive input from the associated user, and communicate the same to a backend component, such as a controller 108, as explained in greater detail below. Preferably, the document processing device 104 is communicatively coupled to the computer network 102 via a suitable communications link 114. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art.

In accordance with the subject application, the document processing device 104 further incorporates a backend component, designated as the controller 108, suitably adapted to facilitate the operations of the document processing device 104, as will be understood by those skilled in the art. Preferably, the controller 108 is embodied as hardware, software, or any suitable combination thereof, configured to control the operations of the associated document processing device 104, facilitate the display of images via the user interface 106, direct the manipulation of electronic image data, and the like. For purposes of explanation, the controller 108 is used to refer to any myriad of components associated with the document processing device 104, including hardware, software, or combinations thereof, functioning to perform, cause to be performed, control, or otherwise direct the methodologies described hereinafter. It will be understood by those skilled in the art that the methodologies described with respect to the controller 108 are capable of being performed by any general purpose computing system, known in the art, and thus the controller 108 is representative of such a general computing device and is intended as such when used hereinafter. Furthermore, the use of the controller 108 hereinafter is for the example embodiment only, and other embodiments, which will be apparent to one skilled in the art, are capable of employing the system and method for generating a customized workflow user interface of the subject application. The functioning of the controller 108 will better be understood in conjunction with the block diagrams illustrated in FIGS. 2 and 3, explained in greater detail below.

The document processing device 104 further includes a thin client 110, communicatively coupled to the document processing device 104. The skilled artisan will appreciate that the thin client 110 is illustrated in FIG. 1 as a component of the controller 108 for example purposes only. It will be apparent to those skilled in the art that the thin client 110 is capable of implementation as a component of the document processing device 104 separate from the controller 108, external to the document processing device 104, or the like. As will understood by those skilled in the art, the thin client is the client portion in a client/server relationship which has little or no application logic, instead relying primarily on the center server for processing. The functioning of the thin client 110 will be discussed in greater detail below.

Communicatively coupled to the document processing device 104 is a data storage device 112. In accordance with the preferred embodiment of the subject application, the data storage device 112 is any mass storage device known in the art including, for example and without limitation, magnetic storage drives, a hard disk drive, optical storage devices, flash memory devices, or any suitable combination thereof. In the preferred embodiment, the data storage device 112 is suitably adapted to store a variety of data including, for example and without limitation, data representative of graphical elements, primitives, graphical user interface primitives, processing workflows, documents, applications, or the like. It will be appreciated by those skilled in the art that while illustrated in FIG. 1 as being a separate component of the system 100, the data storage device 112 is capable of being implemented as internal storage component of the document processing device 104, a component of the controller 108, or the like, such as, for example and without limitation, an internal hard disk drive, or the like. Preferably, the data storage device 112 includes data representative of a plurality of graphical user interface primitives, each corresponding to a display of the document processing device 104 or the control of the document processing device 104.

Similarly to the document processing device 104, the document processing device 116, in accordance with the preferred embodiment of the subject application, also includes an associated user interface 118, such as a touch-screen, LCD display, touch-panel, pointer device, alpha-numeric keypad, or the like, via which an associated user is able to interact directly with the document processing device 116. Preferably, the user interface 118 is advantageously employed to communicate information the associated user and to receive selections therefrom. It will be appreciated by those skilled in the art that the user interface 118 includes a variety of components, suitably adapted to present data to and capture data from the associated user. Similar to the user interface 106 of the document processing device 104, the user interface 118 includes a display, suitably adapted to display one or more graphical elements, text data, or the like, to an associated user, receive input from the associated user, and communicate the same to a backend component, such as a controller 120, as explained in greater detail below. Preferably, the document processing device 116 is in data communications with the computer network 102 via a suitable communications link 126. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art.

In accordance with the preferred embodiment of the subject application, the document processing device 116 includes a backend component, illustrated in FIG. 1 as the controller 120. Preferably, the controller 120 is suitably adapted to facilitate the operations of the document processing device 116, as will be understood by those skilled in the art. Preferably, the controller 120 is embodied as hardware, software, or any suitable combination thereof, configured to control the operations of the associated document processing device 116, facilitate the display of images via the user interface 118, direct the manipulation of electronic image data, and the like. For purposes of explanation, the controller 120 is used to refer to any myriad of components associated with the document processing device 116, including hardware, software, or combinations thereof, functioning to perform, cause to be performed, control, or otherwise direct the methodologies described hereinafter. It will be understood by those skilled in the art that the methodologies described with respect to the controller 116 are capable of being performed by any general purpose computing system, known in the art, and thus the controller 116 is representative of such a general computing device and is intended as such when used hereinafter. Furthermore, the use of the controller 108 hereinafter is for the example embodiment only, and other embodiments, which will be apparent to one skilled in the art, are capable of employing the system and method for generating a customized workflow user interface of the subject application. The functioning of the controller 116 will better be understood in conjunction with the block diagrams illustrated in FIGS. 2 and 3, explained in greater detail below.

The document processing device 116 further includes a thin client 122, in data communication with the document processing device 116. The skilled artisan will appreciate that the thin client 122 is illustrated in FIG. 1 as a component of the controller 120 for example purposes only. It will be apparent to those skilled in the art that the thin client 122 is capable of implementation as a component of the document processing device 116 separate from the controller 120, external to the document processing device 116, or the like. As will be understood by those skilled in the art, the thin client is the client portion in a client/server relationship which has little or no application logic, instead relying primarily on the center server for processing. The functioning of the thin client 122 will be discussed in greater detail below.

Communicatively coupled to the document processing device 116 is a data storage device 124. In accordance with the preferred embodiment of the subject application, the data storage device 124 is any mass storage device known in the art including, for example and without limitation, magnetic storage drives, a hard disk drive, optical storage devices, flash memory devices, or any suitable combination thereof. In the preferred embodiment, the data storage device 124 is suitably adapted to store a variety of data including, for example and without limitation, data representative of graphical elements, primitives, graphical user interface primitives, processing workflows, documents, applications, or the like. It will be appreciated by those skilled in the art that while illustrated in FIG. 1 as being a separate component of the system 100, the data storage device 124 is capable of being implemented as internal storage component of the document processing device 116, a component of the controller 120, or the like, such as, for example and without limitation, an internal hard disk drive, or the like. Preferably, the data storage device 124 includes data representative of a plurality of graphical user interface primitives, each corresponding to a display of the document processing device 116 or the control of the document processing device 116.

The system 100 illustrated in FIG. 1 further depicts a user device 128, in data communication with the computer network 102 via a communications link 132. It will be appreciated by those skilled in the art that the user device 128 is shown in FIG. 1 as a laptop computer for illustration purposes only. As will be understood by those skilled in the art, the user device 128 is representative of any personal computing device known in the art, including, for example and without limitation, a computer workstation, a personal computer, a personal data assistant, a web-enabled cellular telephone, a smart phone, a proprietary network device, or other web-enabled electronic device. The communications link 132 is any suitable channel of data communications known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art. Preferably, the user device 128 is suitably adapted to generate and transmit electronic documents, document processing instructions, user interface modifications, upgrades, updates, personalization data, or the like, to the document processing device 104, the document processing device 116, or any other similar device coupled to the computer network 102.

In accordance with one embodiment of the subject application, the user device 128 further comprises a thin client 130. As discussed above, the thin client is a client component of a client/server relationship, be it hardware, software, or a combination thereof, which has little or no application logic and which relies primarily on the processing abilities of the server component. The functioning of the thin client 130 in the context of the subject application will be explained in greater detail below.

Figure 2:
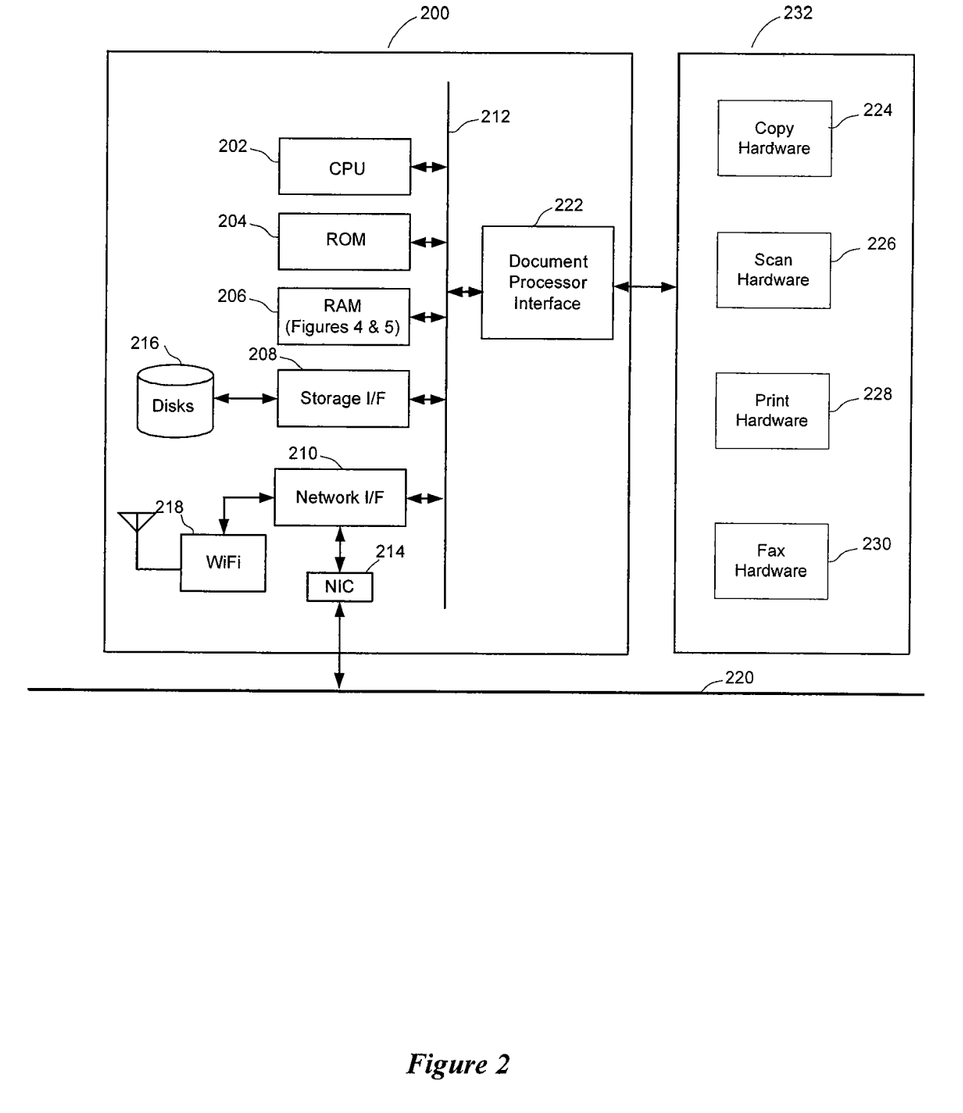
FIG. 2 is a block diagram illustrating controller hardware for use in the thin client graphical user interface development system according to the subject application.

Turning now to FIG. 2, illustrated is a representative architecture of a suitable backend component, i.e., the controller 200, shown in FIG. 1 as the controller 108 and controller 120, on which operations of the subject system 100 are completed. The skilled artisan will understand that the controller 108, 120 is representative of any general computing device, known in the art, capable of facilitating the methodologies described herein. Included is a processor 202, suitably comprised of a central processor unit. However, it will be appreciated that processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the controller 200.

Also included in the controller 200 is random access memory 206, suitably formed of dynamic random access memory, static random access memory, or any other suitable, addressable and writable memory system. Random access memory provides a storage area for data instructions associated with applications and data handling accomplished by processor 202.

A storage interface 208 suitably provides a mechanism for non-volatile, bulk or long term storage of data associated with the controller 200. The storage interface 208 suitably uses bulk storage, such as any suitable addressable or serial storage, such as a disk, optical, tape drive and the like as shown as 216, illustrated in FIG. 1 as the storage devices 112, 124, as well as any suitable storage medium as will be appreciated by one of ordinary skill in the art.

A network interface subsystem 210 suitably routes input and output from an associated network allowing the controller 200 to communicate to other devices. Network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 214 is interconnected for data interchange via a physical network 220, suitably comprised of a local area network, wide area network, or a combination thereof.

Data communication between the processor 202, read only memory 204, random access memory 206, storage interface 208 and network interface subsystem 210 is suitably accomplished via a bus data transfer mechanism, such as illustrated by bus 212.

Also in data communication with bus 212 is a document processor interface 222. Document processor interface 222 suitably provides connection with hardware 232 to perform one or more document processing operations. Such operations include copying accomplished via copy hardware 224, scanning accomplished via scan hardware 226, printing accomplished via print hardware 228, and facsimile communication accomplished via facsimile hardware 230. It is to be appreciated that a controller suitably operates any or all of the aforementioned document processing operations. Systems accomplishing more than one document processing operation are commonly referred to as multifunction peripherals or multifunction devices.

Figure 3:
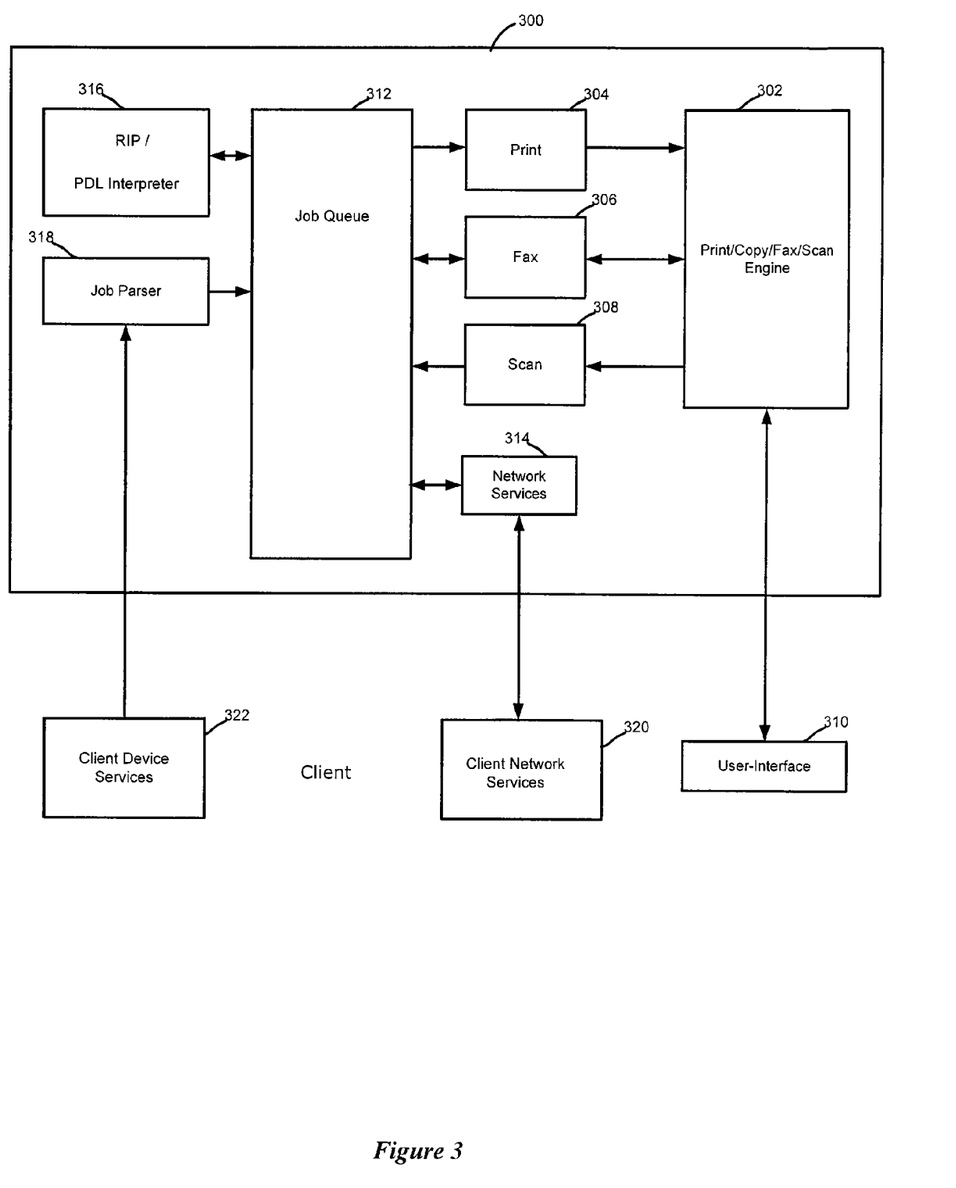
FIG. 3 is a functional diagram illustrating the controller for use in the thin client graphical user interface development system according to the subject application.

Functionality of the subject system 100 is accomplished on a suitable document processing device 104, 116 that includes the controller 200 of FIG. 2, (shown in FIG. 1 as the controllers 108 and 120), as an intelligent subsystem associated with a document processing device. In the illustration of FIG. 3, controller function 300 in the preferred embodiment, includes a document processing engine 302. Suitable controller functionality is that incorporated into the Toshiba e-Studio system in the preferred embodiment. FIG. 3 illustrates suitable functionality of the hardware of FIG. 2 in connection with software and operating system functionality as will be appreciated by one of ordinary skill in the art.

In the preferred embodiment, the engine 302 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document processing devices that are subset of the document processing operations listed above.

The engine 302 is suitably interfaced to a user interface panel 310, which panel allows for a user or administrator to access functionality controlled by the engine 302. Access is suitably via an interface local to the controller, or remotely via a remote thin or thick client.

The engine 302 is in data communication with printer function 304, facsimile function 306, and scan function 308. These devices facilitate the actual operation of printing, facsimile transmission and reception, and document scanning for use in securing document images for copying or generating electronic versions.

A job queue 312 is suitably in data communication with printer function 304, facsimile function 306, and scan function 308. It will be appreciated that various image forms, such as bit map, page description language or vector format, and the like, are suitably relayed from scan function 308 for subsequent handling via job queue 312.

The job queue 312 is also in data communication with network services 314. In a preferred embodiment, job control, status data, or electronic document data is exchanged between job queue 312 and network services 314. Thus, suitable interface is provided for network based access to the controller 300 via client side network services 320, which is any suitable thin or thick client. In the preferred embodiment, the web services access is suitably accomplished via a hypertext transfer protocol, file transfer protocol, uniform data diagram protocol, or any other suitable exchange mechanism. Network services 314 also advantageously supplies data interchange with client side services 320 for communication via FTP, electronic mail, TELNET, or the like. Thus, the controller function 300 facilitates output or receipt of electronic document and user information via various network access mechanisms.

Job queue 312 is also advantageously placed in data communication with an image processor 316. Image processor 316 is suitably a raster image process, page description language interpreter or any suitable mechanism for interchange of an electronic document to a format better suited for interchange with device services such as printing 304, facsimile 306 or scanning 308.

Finally, job queue 312 is in data communication with a parser 318, which parser suitably functions to receive print job language files from an external device, such as client device services 322. Client device services 322 suitably include printing, facsimile transmission, or other suitable input of an electronic document for which handling by the controller function 300 is advantageous. Parser 318 functions to interpret a received electronic document file and relay it to a job queue 312 for handling in connection with the aforedescribed functionality and components.

In operation, primitive data is stored in an associated memory via any suitable means known in the art. As will be appreciated by those skilled in the art, the primitive data corresponds to graphical user interface primitives, that is, basic building blocks in a graphical user interface which are capable of a one-to-one correspondence in memory. In accordance with the subject application, each graphical user interface primitive corresponds to a display of an associated document processing device or a control of an associated document processing device. Suitable graphical user interface primitives include, for example and without limitation, windows, push-buttons, radio-buttons, check boxes, text dialogs, icons, or the like. Selection data is then received via a thin client. Preferably, the selection data corresponds to primitive data corresponding to one or more of the graphical user interface primitives. For purposes of explanation only, reference is made hereinafter to the thin client 110 associated with the document processing device 104. The skilled artisan will appreciate that the operations of the subject system 100 are equally capable of being remotely performed via the thin client 130 of the user device 128, performed by the thin client 122 of the document processing device 116, or the like.

The primitive data is then selectively communicated to a display associated with the thin client 110. Preferably, the primitive data is communicated to the thin client display according to the received selection data resulting in the generation of corresponding visual indicia on the display. Alternatively stated, the graphical user interface elements are displayed via the thin client display. Next, a data set is generated representing a graphical user interface display according to a selected set of indicia that is displayed on the thin client display. Thereafter, map data is generated representing the mapping of a generated data set to user interface data. Preferably, the user interface data corresponds to the display for one or more document processing devices and the control of one or more document processing devices.

In accordance with one example embodiment of the subject application, primitive data is stored in associated memory, such as the data storage device 112 associated with the document processing device 104, or the data storage device 124 associated with the document processing device 116. The skilled artisan will appreciate that such primitive data, when the subject system 100 is implemented via the remote user device 128, is stored on a data storage device (not shown) associated with the user device 128, such as, for example and without limitation, a hard disk drive. Preferably, the primitive data corresponds to graphical user interface primitives, i.e., basic building blocks associated with a graphical user interface. According to the subject application, each graphical user interface primitive corresponds to either a display of an associated document processing device 104, 116, or a control of an associated document processing device 104, 116. Selection data is then received via a thin client, e.g., the thin client 110, 112, or 130 corresponding to the primitive data, which corresponds to one or more graphical user interface primitives. As the skilled artisan will appreciate, the selection data is representative of one or more selected graphical user interface primitives. In accordance with one embodiment of the subject application, the selection data includes position data corresponding to the position of a primitive on the display associated with the thin client 110, 122, 130 or the local display associated with the document processing device 104 or 116. It will be understood by those skilled in the art that the selection data is capable of being received, for example and without limitation, via a touch screen, e.g., user interface 106, 118, associated with the local display of the document processing device 104, 116, respectively, via a pointer corresponding to a selected position on the local graphical display associated with the document processing device 104 or 116, e.g., a mouse, keyboard, or other graphical selection capable device, or the like.

The primitive data is then selectively communicated to a display associated with the thin client, 110, 122, or 130 according to the received selection data. That is, the selected graphical user interface primitives, as represented by the selection data, are communicated to the display of the thin client 110, 122, or 130. The thin client 110, 122, or 130 then generates visual indicia on the associated display representing the received selection data. A data set is then generated representing a graphical user interface display according to a selected set of indicia displayed on the display associated with the thin client 110, 122, or 130. A determination is then made whether additional interface data has been received by the thin client 110, 122, 130. It will be appreciated by those skilled in the art that such interface data includes, for example and without limitation, bit depth data, display resolution data, or the like. When such data is received by the thin client 110, 122, or 130, map data is generated in accordance with the received interface data. The map data is suitably representative of a mapping of a generated data set to user interface data, which corresponds to a display for one or more document processing devices and control of one or more document processing devices. That is, the map data represents the mapping from a basic data set, e.g., graphical primitives, to a user interface data, specific to the device on which the graphical primitives will be displayed.

When no interface data has been received by the thin client 110, 122, or 130, map data is generated representing a mapping of a generated data set to user interface data, which corresponds to a display for one or more document processing devices and the control of one or more document processing devices. The map data is then communicated to a local memory, such as the data storage 112, 124, or RAM associated with the respective document processing device 104, 116. A display is then generated on the local graphical display of the document processing device 104 or 116 corresponding to the map data disposed in the local memory. That is, a display is generated on the user interface 106 or 118 of the corresponding document processing device 104 or 116, respectively corresponding to the map data stored in RAM. The skilled artisan will appreciate that the map data enables the primitives to be mapped into graphical components specific to the display of the respective user interface 106 or 118.

User selection data is then received from an associated user via the user interface 106 or 118 of the respective document processing device 104 or 116. Preferably, the user selection data represents a selected document processing operation to be performed by the corresponding document processing device 104 or 116. The received user selection data is then communicated to local memory, thereby resulting in control data being generated in accordance with the map data. Operations of the respective document processing device 104 or 116 are thereafter controlled in accordance with the generated control data.

In one example embodiment of the subject application, a hardware abstraction to graphical user interface development is accomplished via the separation of graphical user interface applications from the rendering mechanism. Preferably, the rendering mechanism is any hardware, software, or suitable combination thereof, suitably adapted to render data into display capable graphical representations. The skilled artisan will appreciate that such a mechanism is capable of implementation as a component of the thin client 110, 122, 130, the controller 108, 120, a separate component of the document processing device 104, 116, a separate component of the user device 128, or the like. The rendering mechanism is suitably adapted to render multiple display types, such as, for example and without limitation, LCD, touch panel, VGA, SVGA, and the like, multiple display formats, such as, for example and without limitation 640×480, 1024×768, 1280×1024, or the like, multiple operating environments, such as, for example and without limitation, operating systems by LINUX, MICROSOFT WINDOWS, or the like. As will be appreciated by those skilled in the art, the rendering mechanism is suitably configured so as to perform on-the-fly bit-depth conversions for images, thereby rendering the images on the target display. Furthermore, as will be apparent to those skilled in the art, the rendering mechanism is configured to map graphical user interface events to a published user-event contract for graphical user interface applications. As used herein, the contract referenced above refers to the obligations software entities have toward each other based upon formalized rules between the entities.

Preferably, rendering requests, e.g., display of graphical elements, visual indicia, or the like, on a corresponding display, are transmitted to the rendering mechanism as messages. Such rendering requests include, for example and without limitation, screen definitions of user controllers, e.g., windows, push buttons, radio buttons, check boxes, or the like. In accordance with one embodiment of the subject application, the messages are suitably transmitted in an extensible markup language, such as for example and without limitation, XML or the like. A suitable example of such a message includes:

```
<Window id=1 x=0 y=0 h=480 w=640>
  <events>
    <OnLoad></OnLoad>
    <OnDocumentChange></OnDocumentChange>
  </events>
  <TextBox id=2 x=50 y=50 h=50 w=100>
    < PropertyMapping >
      <value binding="literal">Hello</value>
    < PropertyMapping >
  </TextBox>
  <TextBox id=2 x=150 y=50 h=50 w=100>
    < PropertyMapping >
      <value
binding="xpath">Panel/MyPanel/Username</value>
    < PropertyMapping >
  </TextBox>
  <PushButton id=3 x=50 y=150 h=50 w=100>
    <PropertyMapping>
      <caption binding=literal>Click Me!</caption>
    </ PropertyMapping >
    <events>
      <PushButtonClick>
        <EventData>
          <Set
xpath="Panel/MyPanel/Username>Jill!</Set>
        </EventData>
      </PushButtonClick>
    </events>
  <PushButton>
</Window>
```

The rendering mechanism then displays the graphical elements and returns any user activity, such as touch-events, mouse-events, keyboard events, or the like, back to the requestor as these events occur. This skilled artisan will appreciate that the foregoing system 100 is capable of implementation via the user device 128 such that the thin client graphical user interface development occurs on the user device 128 and is subsequently communicated to one of the document processing devices 104, 116 via the computer network 102.

Figure 4:
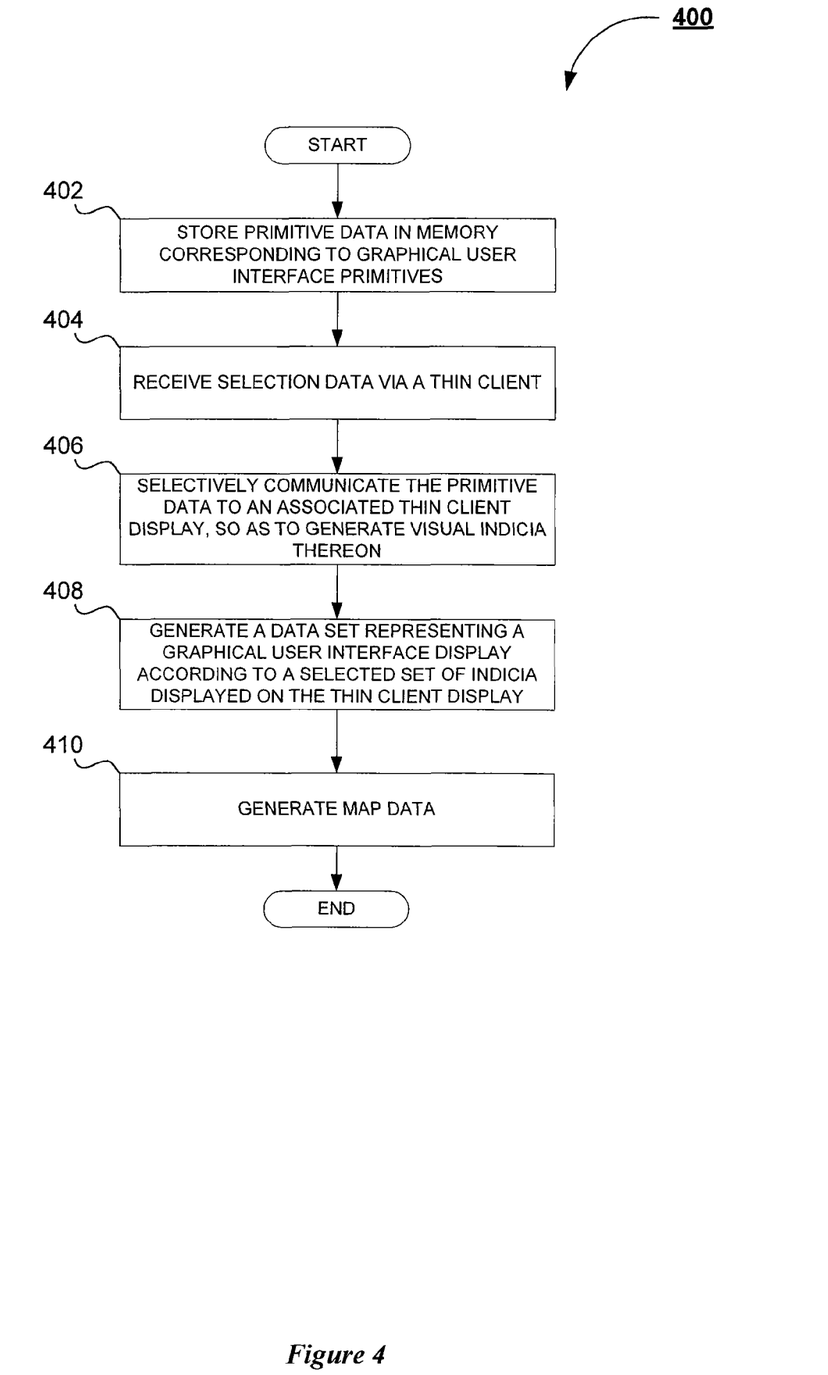
FIG. 4 is a flowchart illustrating a method for thin client graphical user interface development according to the subject application.

The skilled artisan will appreciate that the subject system 100 and components described above with respect to FIG. 1, FIG. 2, and FIG. 3 will be better understood in conjunction with the methodologies described hereinafter with respect to FIG. 4 and FIG. 5. Turning now to FIG. 4, there is shown a flowchart 400 illustrating a method for thin client graphical user interface development in accordance with the subject application. Beginning at step 402, primitive data is stored in memory corresponding to graphical user interface primitives. Preferably, the each primitive corresponds to a display of an associated document processing device or a control of an associated document processing device. Selection data is then received at step 404 via a thin client. The selection data preferably corresponds to primitive data corresponding to at least one of the graphical user interface primitives.

The primitive data is then selectively communicated to a display associated with the thin client at step 406. The thin client then generates a corresponding visual indicia on the associated display. At step 408, a data set is generated representing a graphical user interface display according to a selected set of visual indicia displayed on the display associated with the thin client. Thereafter, map data is generated at step 410 representing a mapping of a generated data set to user interface data. This mapping corresponds to a display for one or more document processing devices and control of one or more document processing devices.

Figure 5:
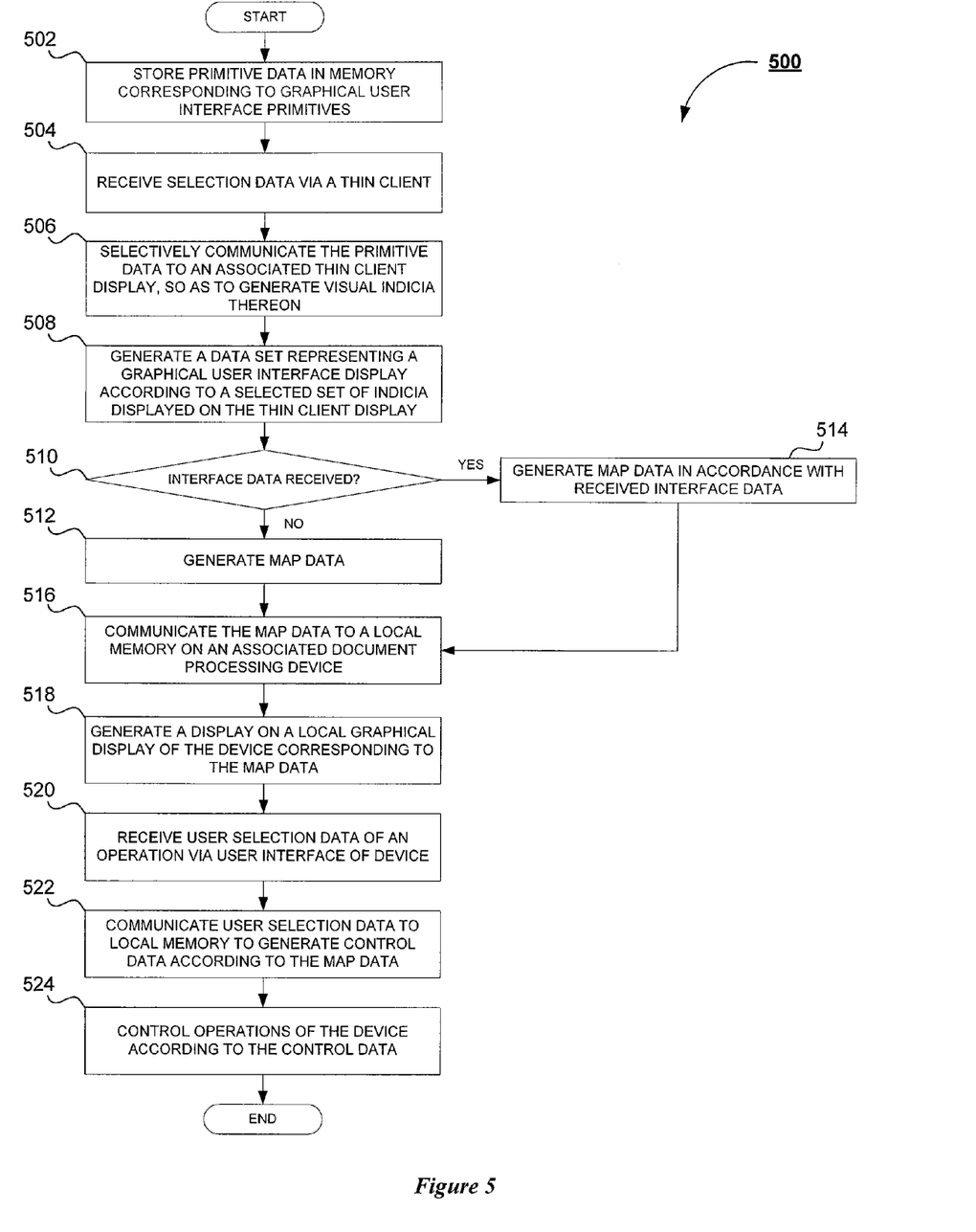
FIG. 5 is a flowchart illustrating a method for thin client graphical user interface development according to the subject application.

Referring now to FIG. 5, there is shown a flowchart 500 illustrating a method for thin client graphical user interface development in accordance with the subject application. The skilled artisan will appreciate that the methodology depicted in FIG. 5 corresponds to graphical and/or textual presentation, as applied to a user interface associated with a document processing device. The use of the subject methodology implemented with respect to a user interface of an associated document processing device is for illustration purposes, and the subject application is not limited only to such an implementation. Reference is made hereinafter to operations on the document processing device 104 for purposes of explanation only, and the skilled artisan will appreciate that the methodology depicted in FIG. 5 is equally applicable to operations on the document processing device 116, the user device 128, and the like. The method begins at step 502 with the storage of primitive data into an associated memory. The primitive data preferably corresponds to graphical user interface primitives, with each primitive corresponding to either a display of an associated document processing device 104 or a control of an associated document processing device 104.

At step 504, selection data is received via a thin client 110 corresponding to primitive data of one or more graphical user interface primitives. The primitive data is then selectively communicated at step 506 to a display associated with the thin client 110 based upon the received selection data. The thin client 110 then generates a corresponding visual indicia on the associated display. At step 508, a data set representing a graphical user interface display is generated according to the selected set of indicia that is displayed on the display associated with the thin client 110. A determination is then made at step 510 whether additional interface data has been received. When interface data has been received, flow proceeds to step 514, whereupon map data is generated in accordance with the received interface data. Preferably the interface data includes, for example and without limitation, data representing bit-depth, resolution, or the like. Flow then proceeds to step 516, whereupon the map data is communicated to a local memory on an associated document processing device 104. When no interface data is received at step 510, flow progresses to step 512, whereupon map data is generated representing the mapping of a generated data set to user interface data corresponding to a display and a control for an associated document processing device 104. The methodology then proceeds to step 516, whereupon the generated map data is communicated to local memory on the associated document processing device 104.

At step 518, a display is generated on the local graphical display of the document processing device 104 in accordance with the received mapping data. User selection data is then received at step 520 from an associated user via the user interface 106 associated with the document processing device 104. Preferably, the user selection data represents the selection by the associated user of a document processing operation to be performed by the associated document processing device 104. The user selection data is then communicated at step 522 to local memory of the document processing device 104. The user selection data is then used, in conjunction with the map data, to generate control data representing the control of the document processing device 104. Operations of the document processing device 104 are thereafter controlled at step 524 in accordance with the control data from local memory.

The subject application extends to computer programs in the form of source code, object code, code intermediate sources and partially compiled object code, or in any other form suitable for use in the implementation of the subject application. Computer programs are suitably standalone applications, software components, scripts or plug-ins to other applications. Computer programs embedding the subject application are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the subject application principles as described, will fall within the scope of the subject application.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed:

1. A thin client graphical user interface development system comprising:
   means for storing a plurality of graphical user interface primitives, each graphical user interface primitive corresponding to at least one of a display element and control element for an associated document processing device;

means for receiving selection data via an associated thin client corresponding to at least one of the graphical user interface primitives;

means for selectively communicating a graphical user interface primitive to an associated thin client display in accordance with the selection data so as to generate a graphical user interface display;

means for generating a data set representative of the graphical user interface display on the associated thin client display; and means for generating map data representative of a mapping of the graphical user interface display for display on and control of at least one associated document processing device.

2. The thin client graphical user interface development system of claim 1 further comprising:

means for communicating the map data to a local memory associated with at least one associated document processing device; and wherein the at least one associated document processing device includes, a user interface including input means and a local graphical display, means for generating a display on the local graphical display corresponding to the map data in the local memory, means for receiving user selection data via the input means corresponding to an operation of the document processing device, means for communicating the user selection data to the local memory so as to generate control data in accordance with the map data, and means for controlling operation of the document processing device in accordance with the control data.

3. The thin client graphical user interface development system of claim 2 wherein the user selection data is received via the input means including a touch screen corresponding to the local graphical display.

4. The thin client graphical user interface development system of claim 2 wherein the user selection data is received via the input means including a pointer corresponding to a selected position on the local graphical display.

5. The thin client graphical user interface development system of claim 1 further comprising:

means for receiving interface data including at least one of bit depth and resolution of a display and wherein;

the map data is generated in accordance with the interface data.

6. The thin client graphical user interface development system of claim 1 wherein the selection data includes a position of graphical user interface primitives on the associated thin client and on a local graphical display on the at least one associated document processing device.

7. A method for thin client graphical user interface development comprising:

storing a plurality of graphical user interface primitives in an associated memory, each graphical user interface primitive corresponding to at least one of a display element and a control element for an associated document processing device;

receiving selection data via an associated thin client corresponding to at least one of the graphical user interface primitives;

selectively communicating a graphical user interface primitive to an associated thin client display in accordance with the selection data so as to generate a graphical user interface display;

generating a data set representative of the graphical user interface display on the associated thin client display; and generating map data representative of a mapping of the graphical user interface display for display on and control of at least one associated document processing device.

8. The method for thin client graphical user interface development of claim 7 further comprising the steps of:

communicating the map data to a local memory in at least one associated document processing device;

generating a display on a local graphical display of the at least one associated document processing device corresponding to the map data in the local memory;

receiving user selection data via a user interface of the at least one associated document processing device corresponding to an operation of the document processing device;

communicating the user selection data to the local memory so as to generate control data in accordance with the map data; and controlling operation of the document processing device in accordance with the control data.

9. The method for thin client graphical user interface development of claim 8 wherein the user selection data is received via a touch screen corresponding to the local graphical display.

10. The method for thin client graphical user interface development system of claim 8 wherein the user selection data is received via a pointer corresponding to a selected position on the local graphical display.

11. The method for thin client graphical user interface development of claim 7 further comprising the steps of:

receiving interface data including at least one of bit depth and resolution of a display and wherein;

the map data is generated in accordance with the interface data.

12. The method for thin client graphical user interface development of claim 7 wherein the selection data includes a position of graphical user interface primitives on the associated thin client and on a local graphical display on the at least one associated document processing device.

13. A computer-implemented method for thin client graphical user interface development comprising the steps of:

storing a plurality of graphical user interface primitives in an associated memory, each graphical user interface primitive corresponding to at least one of a display element and a control element of an associated document processing device;

receiving selection data via an associated thin client corresponding to at least one of the graphical user interface primitives;

selectively communicating a graphical user interface primitive to an associated thin client display in accordance with the selection data so as to generate a corresponding graphical user interface display;

generating a data set representative of a graphical user interface display on the associated thin client display; and generating map data representative of a mapping of the graphical user interface display for display on and control of at least one associated document processing device.

14. The computer-implemented method for thin client graphical user interface development of claim 13 further comprising the steps of:

communicating map data to a local memory in the at least one associated document processing device;

generating a display on a local graphical display of the at least one associated document processing device corresponding to the map data in the local memory, receiving user selection data via a user interface of the at least one associated document processing device corresponding to an operation of the document processing device;

communicating the user selection data to the local memory so as to generate control data in accordance with the map data, and controlling operation of the document processing device in accordance with the control data.

15. The computer-implemented method for thin client graphical user interface development of claim 14 wherein the user selection data is received via a touch screen corresponding to the local graphical display.

16. The computer-implemented method for thin client graphical user interface development system of claim 14 wherein the user selection data is received via a pointer corresponding to a selected position on the local graphical display.

17. The computer-implemented method for thin client graphical user interface development of claim 13 further comprising the steps of:

receiving interface data including at least one of bit depth and resolution of a display and wherein;

the map data is generated in accordance with received interface data.

18. The computer-implemented method for thin client graphical user interface development of claim 13 wherein the selection data includes position data corresponding to a position of graphical user interface primitives on the associated thin client and on a local graphical display on the at least one associated document processing device.

* * * * *